US010727471B2

(12) United States Patent
Choi et al.

(10) Patent No.: US 10,727,471 B2
(45) Date of Patent: Jul. 28, 2020

(54) METHOD FOR MANUFACTURING LITHIUM ION POLYMER BATTERY, BATTERY CELL, AND LITHIUM ION POLYMER BATTERY INCLUDING THE SAME

(75) Inventors: Sang-Kyu Choi, Daejeon (KR); Kwang Ho Yoo, Daejeon (KR); Young Joon Shin, Daejeon (KR)

(73) Assignee: LG Chem, Ltd. (KR)

( * ) Notice: Subject to any disclaimer, the term of this patent is extended or adjusted under 35 U.S.C. 154(b) by 269 days.

(21) Appl. No.: 12/980,713

(22) Filed: Dec. 29, 2010

(65) Prior Publication Data

US 2011/0097630 A1 Apr. 28, 2011

Related U.S. Application Data

(63) Continuation of application No. PCT/KR2010/006865, filed on Oct. 7, 2010.

(30) Foreign Application Priority Data

Oct. 7, 2009 (KR) .......................... 10-2009-0095030

(51) Int. Cl.
*H01M 2/36* (2006.01)
*H01M 10/058* (2010.01)
(Continued)

(52) U.S. Cl.
CPC ......... *H01M 2/361* (2013.01); *H01M 2/0257* (2013.01); *H01M 4/0447* (2013.01);
(Continued)

(58) Field of Classification Search
None
See application file for complete search history.

(56) References Cited

U.S. PATENT DOCUMENTS 5,460,904 A 10/1995 Gozdz et al.
5,750,282 A * 5/1998 Chi ..................... H01M 6/5072
29/623.5
(Continued)

FOREIGN PATENT DOCUMENTS

JP 10-334926 A 12/1998
JP 2000-231915 A 8/2000
(Continued)

OTHER PUBLICATIONS

International Search Report, dated May 23, 2011, for International Application No. PCT/KR2010/006865.
(Continued)

*Primary Examiner* — Barbara L Gilliam
(74) *Attorney, Agent, or Firm* — Lerner, David, Littenberg, Krumholz & Mentlik, LLP

(57) ABSTRACT

A method for manufacturing a lithium ion polymer battery is provided in which in injecting electrolyte into a lithium ion polymer battery, the battery cell is immersed in an electrolyte impregnation bath to allow the electrolyte to be impregnated into the cell. The electrolyte can be impregnated simultaneously, and as the battery cell is activated, the electrolyte is settled down in the interior of the battery cell. Thus, when the battery cell is sealed, a phenomenon that the electrolyte is present at the sealed portion can be prevented.

5 Claims, 2 Drawing Sheets

(51) Int. Cl.
*H01M 10/04* (2006.01)
*H01M 10/052* (2010.01)
*H01M 10/44* (2006.01)
*H01M 10/0565* (2010.01)
*H01M 2/02* (2006.01)
*H01M 4/04* (2006.01)

(52) U.S. Cl.
CPC ....... *H01M 10/049* (2013.01); *H01M 10/052* (2013.01); *H01M 10/058* (2013.01); *H01M 10/0565* (2013.01); *H01M 10/446* (2013.01); *Y10T 29/4911* (2015.01); *Y10T 29/49115* (2015.01)

(56) References Cited

U.S. PATENT DOCUMENTS

| | | | | |
|---|---|---|---|---|
| 5,874,824 | A | * | 2/1999 | Lee ...................... H01M 4/0445 320/130 |
| 6,007,945 | A | * | 12/1999 | Jacobs ................ H01M 4/0447 429/218.1 |
| 6,171,723 | B1 | | 1/2001 | Loch et al. |
| 2002/0031710 | A1 | * | 3/2002 | Kezuka et al. ................ 429/303 |
| 2002/0160253 | A1 | * | 10/2002 | Vaidyanathan ..... H01M 10/049 429/52 |
| 2005/0042516 | A1 | * | 2/2005 | Oh et al. ........................ 429/246 |
| 2006/0051675 | A1 | * | 3/2006 | Musha et al. ............ 429/231.95 |
| 2010/0024204 | A1 | | 2/2010 | Min et al. |
| 2010/0192362 | A1 | * | 8/2010 | Yoon ..................... H01M 4/139 29/623.2 |

FOREIGN PATENT DOCUMENTS

| | | |
|---|---|---|
| JP | 2003-7262 A | 1/2003 |
| KR | 10-1997-0031033 A | 6/1997 |
| KR | 10-2000-0071353 A | 11/2000 |
| KR | 10-2002-0019008 A | 3/2002 |
| KR | 10-0824869 B1 | 4/2008 |
| WO | WO 2008/100091 A1 | 8/2008 |

OTHER PUBLICATIONS

Extended European Search Report for corresponding Application No. 10822253.0 dated Sep. 18, 2013.
Chinese Office Action for Chinese Application No. 201080045500.7, dated Jan. 13, 2014.

* cited by examiner

[Fig. 1]
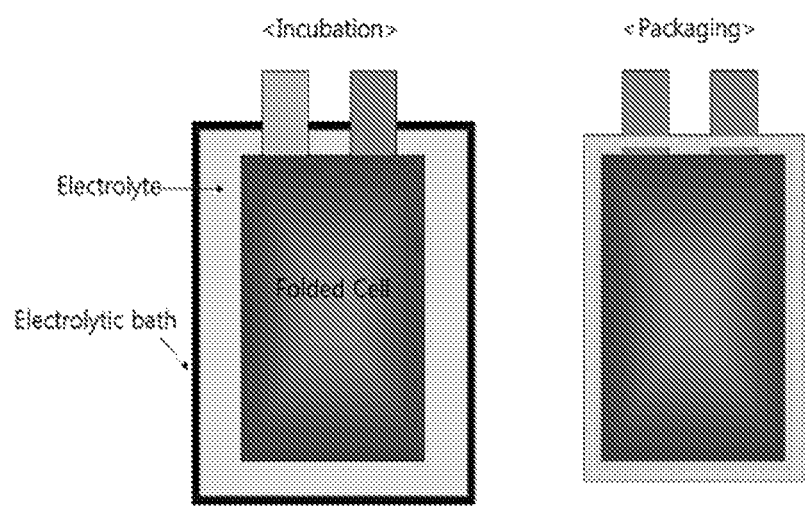
[Fig. 2]
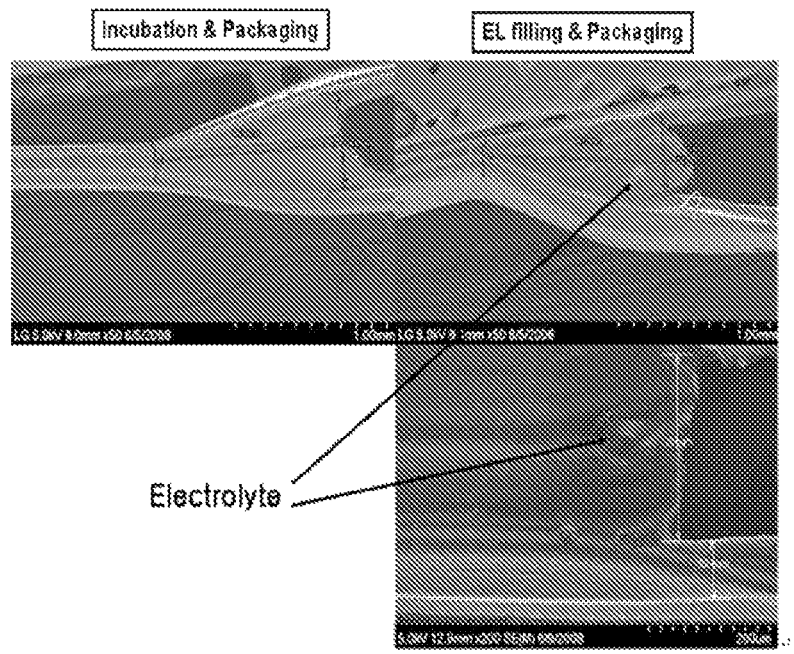

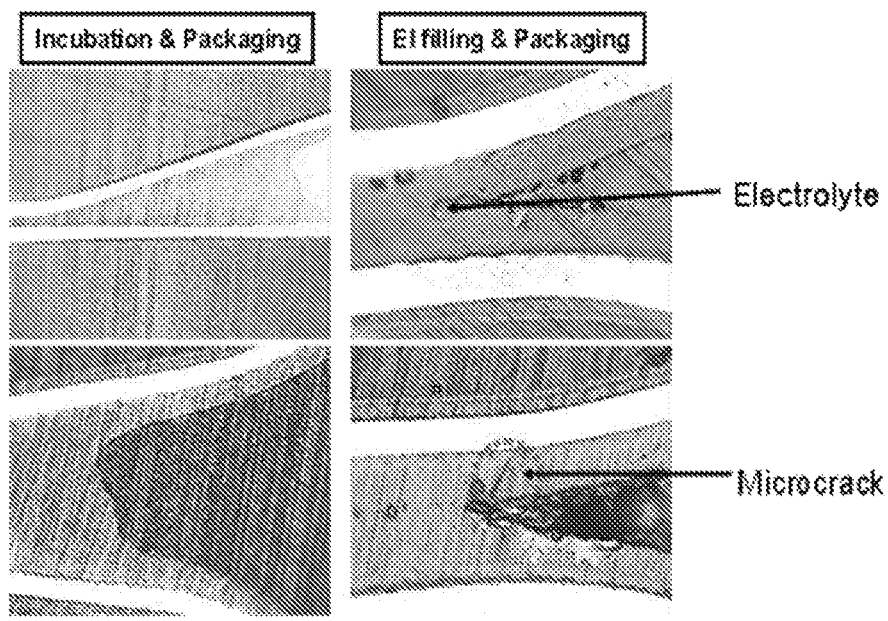
[Fig. 3]

METHOD FOR MANUFACTURING LITHIUM ION POLYMER BATTERY, BATTERY CELL, AND LITHIUM ION POLYMER BATTERY INCLUDING THE SAME

The present application is a Continuation of PCT International Application No. PCT/KR2010/006865 filed on Oct. 7, 2010, which claims the benefit of Korean Patent Application No. 10-2009-0095030 filed Oct. 7, 2009. The disclosures of said applications are incorporated by reference herein.

BACKGROUND OF THE INVENTION

1. Field of the Invention

The present invention relates to a pouch type lithium ion polymer battery and a method for manufacturing the same, and more particularly, to a method for injecting electrolyte into the interior of a battery cell.

2. Description of the Related Art

A lithium ion polymer battery is manufactured by packaging an outer edge of a folded cell with a packing material of an aluminum pouch. In order to manufacture the battery, a battery cell is put into the aluminum pouch and an electrolyte is injected thereinto, which are then activated, subjected to a degassing process, and finally sealed. In this process, electrolyte present on an inner wall face of a sealed portion of the pouch is sealed together (agglutination sealing of electrolyte), or when sealing is finally made simultaneously with a vacuum suction, gas phase molecules of the electrolyte infiltrate into the sealed portion through diffusion simultaneously in the event of the vacuum suction. A microcrack or a defect caused by the electrolyte molecules smeared on the sealed portion serves as a current passage with the exterior to cause a local dielectric breakdown (or microcrack) or drastically degrades a sealing strength.

Thus, in an effort to solve this problem, EP 0994519 has proposed a method of filling a battery cell with electrolyte in which electrolyte is injected through a nozzle connected to a top portion of the wound battery cell to thus impregnate the electrolyte in the cell. In addition, Korean Laid Open Publication No. 10-0686838 discloses a lithium secondary battery in which a plurality of projections in a mesh form are configured to have different heights at a lower insulating plate to increase mobility of electrolyte, thus improving impregnation of the electrolyte. However, even with this method, the problem of adhesive sealing of electrolyte cannot be satisfactorily solved. Also, the necessity of preparing a method for effectively injecting electrolyte still remains.

Meanwhile, Korean Registered No. 10-0824869 shows off advantages in that because a degassing process is omitted in the process of manufacturing a polymer or angular type battery, time and process can be shortened, the packing material can be diversified for the polymer type battery and the angular type battery can be compressed. However, this patent has a problem in that a polymer pouch that degrades a cell performance due to the increase in HF within a cell is used, instead of a polymer packing material having a dual-layer structure, because moisture infiltration occurs excessively. Thus, with this patent, an effect of preventing an adhesive sealing with electrolyte caused in the existing heat fusion method and preventing a shortened cell life span due to dielectric breakdown cannot be expected.

In addition, this patent claims that after electrolyte is impregnated, an electrode assembly is pressurized to have an effect, but when the compression is performed before and after activation processes, the respective electrode assemblies (folded cells) are tightly attached to allow electric charges to move between the electrode assemblies to form an inter-cell serial connection, resulting in the possibility of an electrical connection.

SUMMARY OF THE INVENTION

Thus, an object of the present invention is to prevent a wetting phenomenon of electrolyte on an inner wall of a pouch in case of sealing for packaging of a battery cell in a process of manufacturing a lithium ion polymer battery, thus implementing a complete sealing and increasing a sealing strength.

Another object of the present invention is to provide a method for simply manufacturing a battery by omitting a degassing process.

To achieve the above objects, there is provided a method for manufacturing a lithium ion polymer battery by packaging a battery cell within a packing material, wherein the battery cell is immersed in an electrolytic bath to allow the electrolyte to be impregnated into the battery cell.

In impregnating the battery cell, the entirety of a battery cell body part including a negative electrode, a positive electrode, and a separator may be immersed in the electrolytic bath.

The electrolyte impregnation may include a wetting process performed under a pressure of 90 KPa to 100 KPa.

After the electrolyte impregnation, a forming process may be performed in a state in which the battery cell is taken out of the electrolytic bath and mounted, and the forming process may be performed at an SOC (State of Charge) 30% to SOC 50%.

After the electrolyte impregnation, the battery cell may be activated and the activate battery cell may be inserted into a pouch and then sealed.

After the battery cell is activated, an electrolyte aging process is performed so that the electrolyte within the battery cell can reach a certain amount of electrolyte impregnation. In this case, the aging process may be performed at 19° C. to 25° C.

A process of removing extra electrolyte from the battery cell may be performed in the aging process.

To achieve the above objects, there is provided a battery cell including a negative electrode, a positive electrode, and a separator, wherein a jelly type electrolyte is contained in the interior of the cell.

To achieve the above objects, there is provided a lithium ion polymer battery manufactured by inputting a battery cell into a packing material and then vacuum-sealing it.

A charge and discharge efficiency of the battery cell ranges from 99.7% to 99.9%, and an electrolyte leakage amount of the battery cell ranges from 0.2% to 0.5%.

According to exemplary embodiments of the present invention, in injecting electrolyte, the battery cell is immersed in the electrolytic bath to allow the electrolyte to be impregnated between air gaps in the interior of the battery cell, whereby the electrolyte can be impregnated simultaneously, and thereafter, as the battery cell is activated, the electrolyte is settled down between the air gaps in the interior of the battery cell. Thus, even when vacuum suction is performed in the final sealing operation, a phenomenon that the electrolyte covers or smears the sealed portion does not occur.

In addition, in manufacturing the lithium ion polymer battery, the possibility in which the electrolyte covers or smears the sealed portion of the packing material (agglutination sealing) is eliminated, and all the faces are sealed under the same conditions, so a sealing strength more than requirements can be satisfied. In addition, an insulation resistance breakdown otherwise caused by a microcrack or a defect due to adhesive sealing of electrolyte can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view illustrating the process of manufacturing a lithium ion polymer battery according to an incubation and packaging method according to an exemplary embodiment of the present invention; and FIGS. 2 and 3 are images of the sections of sealed portions of a battery cell of the Embodiment of the present invention and that of Comparative Example.

DETAILED DESCRIPTION OF THE INVENTION

In manufacturing a pouch type lithium ion polymer battery, currently, a folded cell of a completed battery is put into a packing material and packaged, electrolyte is injected, an activation process is performed, the packing material is open to exhaust gas generated during the activation process, and then a sealing operation is finally performed. In this case, an electrolyte wetting phenomenon occurs at an inner wall of the packing material in the process of injecting the electrolyte, or gaseous/liquid electrolyte may be spread due to a pressure difference caused by a vacuum suction in the final sealing operation after the cell is open in the degassing process, and in this process, a current passage may be generated between the interior and exterior of the cell due to the electrolyte covering or smearing a sealed portion of the packing material. This brings about an insulation resistant breakdown and significant degradation of a sealing strength to result in degradation of the performance of the cell.

Thus, in an exemplary embodiment of the present invention, electrolyte is impregnated in a battery cell through an incubation and packaging method to thereby maintain a sealing strength of the same conditions on every face of a pouch to be sealed and eliminate the degassing process.

In detail, the present invention provides a method for manufacturing a pouch type battery in which a battery cell is immersed in an electrolyte-filled electrolytic bath for a certain period of time in the process of manufacturing a pouch type battery, to thus allow the electrolyte to be impregnated into the interior of the battery cell.

First, a folded cell is completed according to a stacking and folding method or a jelly rolling method in the same manner and then fixed in an electrolyte-filled electrolytic bath, for which electrolyte setting, forming and aging processes are performed, and then, the cell is taken out and adjusted to reach a defined amount of electrolyte impregnation.

The wetting process is a process of providing a driving force to allow the injected electrolyte to be well impregnated into the interior of an electrode, a separator or between bicells. In an exemplary embodiment of the present invention, because the electrolyte is allowed to be absorbed in a state in which the battery cell is immersed in the electrolytic bath, not a packing material, the wetting process for inducing the impregnation can be omitted, and if the wetting process is performed, a wetting time can be shortened. In this case, preferably, the wetting process is performed at a pressure of 90 KPa to 100 KPa in a vacuum chamber. For example, if the wetting process is performed at a pressure lower than 90 KPa, the electrolyte cannot be easily introduced into the battery cell, and if the welling process is performed at a pressure higher than 100 KPa, the electrolyte would be excessively introduced to make electrolyte within the battery cell to be released.

In the present invention, the wetting process is performed for 30 minutes, and in this case, preferably, the wetting process is performed for a certain period of time (e.g., five minutes) and then repeatedly performed after a relatively short time of recess (e.g., one minute), rather than being continuously performed, whereby the wetting process can be smoothly performed.

The forming process refers to an activation process in which current is first applied. The forming process is performed in a state in which the battery cell is taken out of the electrolytic bath and mounted when a designed amount of electrolyte is reached. In this case, preferably, the forming process is performed at an SOC (State of Charge) 30% to SOC 50%. For example, if the forming process is performed at below SOC 30%, an SEI (Solid Electrolyte Interface) film is less generated, and conversely, if the forming process is performed at above SOC 50%, the SEI film is more generated to hamper a smooth forming process.

The aging process refers to a process for stabilizing the battery. The aging process is performed at 19° C. to 25° C. in a state that the battery cell is mounted. For example, if the aging process is performed at below 19° C., the electrolyte is not well impregnated, and if the aging process is performed at above 25° C., an active material is likely to be eluted.

In order to measure as to whether or not the electrolyte has been properly impregnated, a method for measuring an electrolyte impregnation amount is used as the most direct method. In detail, the difference between the weight of the cell and the mounting stand before the battery cell is immersed in the electrolytic bath and the weight of the cell and the mounting stand after the battery cell is immersed in the electrolytic bath corresponds to the amount of the impregnated electrolyte, and when the amount of the impregnated electrolyte reaches a designed amount of electrolyte, it is determined that the electrolyte impregnation is completed, and the activation process is performed. Meanwhile, as a secondary method for verifying the amount of impregnated electrolyte, the impedance of the cell is measured in real time. A capacitance value obtained from the impedance when the impregnation is completed tends to be saturated, which indirectly verifies the impregnation completion.

The completed battery cell has a form of a dry cell in which the electrolyte is seated in a jelly state. The dry cell is put in a packing material and then vacuum-sealed.

When the electrolyte is injected into the battery cell by using a separate electrolytic bath and packed with a packing material according to the incubation and packaging method as described above, the probability that the electrolyte will cover or smear the sealed portion of the packing material in the electrolyte injection step or in the final sealing process to lower the sealing strength or break the insulation resistance can be remarkably reduced and a complete sealing can be implemented.

In order to impregnate the electrolyte in the battery cell, preferably, the entirety of the body part of the battery cell is impregnated in the electrolyte. Namely, as shown in FIG. 1, the body part of the cell including the negative electrode, the positive electrode, and the separator, excluding a positive electrode tap and a negative electrode tap protruded from the uppermost portion of the battery cell, is fully immersed in the electrolyte. According to this method, the electrolyte can be simultaneously absorbed into the entire body of the battery cell. Namely, the electrolyte can be evenly impregnated into the upper, lower, left and right portions of the cell, and in addition, the electrolyte can be impregnated from an outermost angle of the cell to the central portion within a short time. Thus, as described above, according to the present exemplary embodiment, the pressurizing or vacuum-pressurizing process which is generally performed to spread the electrolyte in the electrolyte injection step can be omitted.

The impregnation of the battery cell may vary depending on the size of a cell or the density of electrolyte, and the cell is immersed in the electrolytic bath for approximately two hours, the activation process is performed, and then, the cell is placed on a mounting stand or an empty bath to allow the electrolyte to flow down or vaporize, thus eliminating extra electrolyte. Through this process, the electrolyte which has permeated through the air gaps within the battery cell can be fixed in the form of a jelly within the cell and, at the same time, the electrolyte within the battery cell is adjusted to reach a defined impregnation amount. Then, the electrolyte is settled down within the battery cell, so although the vacuum suction is performed in the follow-up pouch sealing processing, the electrolyte can be prevented from covering or smearing the sealed portion.

In addition, in the battery cell manufacturing process, the activation process of the battery cell may be performed in the state in which the battery cell is impregnated in the electrolytic bath. Namely, rather than performing the process of injecting the battery cell and the electrolyte into the pouch, temporarily sealing them, performing an activation reaction, opening the pouch and performing degassing, the battery cell is immersed in the electrolytic bath and, when the electrolytic is impregnated in the interior of the battery cell to a degree, an activation process is immediately performed. Then, gas generated during the activation process is immediately gone in the air, so the degassing process is not necessary. In addition, in the present exemplary embodiment, the process of positioning the battery cell in a vacuum state and performing pressurization or the like in order to allow electrolyte to be easily wet when the electrolyte is generally injected is not required.

In the method for manufacturing a battery according to an exemplary embodiment of the present invention, after the electrolyte is sufficiently impregnated in the interior of the battery cell, it is activated, extra electrolyte is removed, and then sealing is performed, thus manufacturing the battery. Thus, the battery manufacturing process is simple. In addition, the prevent invention provides the battery cell characterized to be immersed in the electrolytic bath for a certain time to allow the electrolyte to be evenly impregnated over the entire cell. The battery cell is a dry cell in which electrolyte is settled down in a jelly form within the cell through the simultaneous impregnation, activation and aging process.

Also, the present invention provides a lithium ion polymer battery completed by vacuum-sealing the dry cell with a packing material.

The present invention will be described in detail through the following embodiment.

Embodiment

Electrolyte (Electrolytic salts: $LiPF_6$; solvent: EMC/DMC/DEC/EC; additive: PS, VC, FEC) was put in an electrolytic bath, in which a battery cell (15 Ah class) was put such that an electrode part is entirely immersed, and then left for two hours at room temperature.

Thereafter, with the battery cell immersed in the electrolytic bath, the battery cell was activated through a cycle reaction of 1 cycle at 1.5 A and 3 hr.

Subsequently, the battery cell was taken out of the electrolytic bath and left on a mounting stand for one hour at room temperature. The thusly completed battery cell was put in an aluminum pouch (D-EL408H2 grade, DNP) and vacuum-sealed (upper and lower portions, 180° C., 2.5 s, 95 kPa).

Comparative Example

Electrolyte was injected according to the conventional method, and wetting, forming, and degassing operations were performed thereon. Finally, packaging was performed to manufacture a battery cell.

Charge and discharge testing was performed on the battery cells manufactured according to Embodiment and Comparative Example, in which a discharge capacity was measured on the basis of a charge capacity of 15 Ah several times. The measurement results showed that a discharge capacity according to Embodiment ranged from 14.95 Ah to 14.99 Ah, and a discharge capacity according to Comparative Example ranged from 14.75 Ah to 14.80 Ah. Charge and discharge efficiency (discharge capacity/charge capacity*100) was calculated on the basis of the discharge capacities of Embodiment and Comparative Example to obtain 99.7% to 99.9% and 98.3% to 98.7%, respectively.

The reason for the remarkable difference in the charge and discharge efficiency is because, in the case of impregnating the battery cell in the electrolytic bath filled with electrolyte according to the present invention, impregnation and wetting were performed evenly compared with the related art, minimizing an initial irreversible part. In addition, according to the method of Comparative Example, lithium is precipitated from a separator overall due to wetting deficiency caused by the defective impregnation of the battery cell, which results in an increase in the thickness and a capacity deficiency. In this case, reaction marks actually remain unevenly on the surface of the electrode.

FIGS. 2 and 3 show captured sectional images of sealed portions of the battery cells manufactured according to Embodiment and Comparative Example. It is noted from FIGS. 2 and 3 that the battery cell manufactured according to manufacturing method of the present invention does not have such electrolyte leakage and microcrack discovered from the battery cell according to Comparative Example. For example, when 60 g of electrolyte was impregnated according to the method of Comparative Example, sealing was performed simultaneously when vacuumizing was performed, so electrolyte was trapped and electrolyte salt was present at a sealed portion, resulting in 2 g to 3 g of electrolyte leakage amount (3% to 5%). In comparison, when 60 g of electrolyte was impregnated according to the method of Embodiment, 0.1 g to 0.3 g of electrolyte leakage amount (0.2% to 0.5%), significantly smaller than that of Comparative Example, was generated. Thus, according to the manufacturing method of Example of the present invention the problems possibly caused by the agglutination sealing of electrolyte at the sealed portion, e.g., the leakage of electrolyte and the contamination of electrolyte at the sealed portion, can be solved.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for manufacturing a lithium ion polymer battery, which comprises steps of:
   (a) immersing a battery cell including a negative electrode, a positive electrode, and a separator in an electrolytic bath to allow electrolyte to be impregnated into the interior of the battery cell;
   (b) subsequently activating the battery cell by a cycle reaction in a state in which it is still immersed in the electrolytic bath, wherein the step (b) is performed at an SOC (State of Charge) 30% to SOC 50%;
   (c) taking the battery cell out of the electrolytic bath;
   (d) placing the battery cell on a mounting stand or an empty bath at 19° C. to 25° C. for about 1 hour to eliminate extra electrolyte, such that the battery cell becomes a dry cell in which the electrolyte is present in a jelly form; and
   (e) inserting the battery cell into a pouch and then sealing the pouch, whereby electrolyte does not enter a seal of the pouch,
   wherein an electrolyte leakage amount of the battery cell after performing sealing ranges from 0.2% by weight to 0.5% by weight of total weight of impregnated electrolyte.

2. The method of claim 1, wherein in the step (a), the electrolyte impregnation comprises a wetting process performed under a pressure of 90 KPa to 100 KPa in a vacuum chamber.

3. The method of claim 1, wherein the step (d) is performed until the electrolyte within the battery cell can reach a predetermined amount of electrolyte impregnation.

4. The method of claim 1, wherein said method is performed without degassing.

5. The method of claim 1, wherein the activating is performed after the amount of the impregnated electrolyte reaches a designed amount of electrolyte.

* * * * *